US00RE38950E

(19) United States
(12) Reissued Patent
Maiers et al.

(10) Patent Number: US RE38,950 E
(45) Date of Reissued Patent: Jan. 31, 2006

(54) WATERPROOF DECKING METHOD AND APPARATUS

(76) Inventors: Charles P. Maiers, 12528 Britwell Ct., Orlando, FL (US) 32837-6540; Gerald J. Maiers, 12088 Blackheath Cir., Orlando, FL (US) 32837-5605

(21) Appl. No.: 10/330,799

(22) Filed: Dec. 27, 2002

Related U.S. Patent Documents

Reissue of:
(64) Patent No.: 5,546,719
Issued: Aug. 20, 1996
Appl. No.: 08/324,111
Filed: Oct. 14, 1994

(51) Int. Cl.
*E04B 7/20* (2006.01)

(52) U.S. Cl. ..... 52/408; 52/96; 52/97; 52/302.6; 52/302.3; 52/310

(58) Field of Classification Search ..... 52/408, 52/319, 94, 96, 97, 302.1, 302.3, 302.6, 310
See application file for complete search history.

(56) References Cited

U.S. PATENT DOCUMENTS

| | | | | | |
|---|---|---|---|---|---|
| 227,687 | A | * | 5/1880 | Foster et al. | |
| 2,646,011 | A | * | 7/1953 | Ager | |
| 3,093,931 | A | * | 6/1963 | Waring | 52/96 |
| 3,434,260 | A | * | 3/1969 | Carter | |
| 4,274,238 | A | * | 6/1981 | O'Riordain | |
| 4,419,850 | A | * | 12/1983 | Butzen | |
| 4,658,554 | A | * | 4/1987 | Riley et al. | |
| 4,663,894 | A | * | 5/1987 | LaRoche et al. | |
| 4,709,518 | A | * | 12/1987 | Lane | 52/94 |
| 4,719,723 | A | * | 1/1988 | Van Wagoner | |
| 4,780,997 | A | * | 11/1988 | Taylor et al. | 52/96 |
| 4,780,999 | A | * | 11/1988 | Webb et al. | 52/96 |
| 4,937,990 | A | * | 7/1990 | Paquette | |
| 5,031,367 | A | * | 7/1991 | Butzen | 52/60 |
| 5,144,782 | A | * | 9/1992 | Paquette et al. | |
| 5,189,853 | A | * | 3/1993 | Braine et al. | 52/96 |
| 5,251,411 | A | * | 10/1993 | Kelley et al. | |
| 5,272,846 | A | * | 12/1993 | Kelley et al. | 52/96 |
| 5,414,965 | A | * | 5/1995 | Kelley et al. | 52/60 |
| 2003/0056445 | A1 | * | 3/2003 | Cox | 52/62 |

OTHER PUBLICATIONS

Summerfield Suites Hotel, Two drawings for Project Number 90160.
Order in *Farris Gypsum Floors of Florida, Inc., d/b/a Farris Floor Systems* v. *Charles P. Maiers, et al.,* filed Jul. 3, 2001.
Exhibits cited in *Farris Gypsum Floors of Florida, d/b/a Farris Floor Systems* v. *Charles p. Maiers, et al.*, filed Jul. 3, 2001, case No. 6:99–cv–923–Orl–28KRS:*
1. Affidavit of Glenn Bowles,*
2. 2. Cited pages from the Deposition of George T. Barnes, plus deposition exhibits 11 and 13,*
3. Cited pages from the Deposition of E. keith Voltz, plus deposition exhibit 6,*
4. Cited pages from the Deposition of Timothy Iseman,*
Additional exhibits from the litigation Case No. 6:99–cv–923–Orl–28KRS for review by Examiner:*
5. Fax from Joey Jungman,*
6. Selected pages from Depositoin of Joey Jungman,*
7. Affidavit of James A. Holt.*

* cited by examiner

*Primary Examiner*—Brian E. Glessner
(74) *Attorney, Agent, or Firm*—James H. Beusse; Beusse Brownlee Wolter Mora & Maire, P.A.

(57) ABSTRACT

A waterproof deck includes a deck subflooring supported on joists adjacent a building, a flashing adjacent a building, and a drip edge attached along the edge of a subflooring where the water runs off the deck. An elastomeric waterproofing material covers the subflooring and a strip of T-bar edging is attached along the edge of the subfloor and has a portion extending over the elastomeric waterproofing material and over the drip edge and another portion extending above the subfloor to form a raised edge therealong. Concrete covers the elastomeric waterproofing material and subfloor to the top edge of the T-bar raised edge so that water on the concrete flooring runs off the deck over the T-bar drip edge and drains from beneath the concrete floor over the drip edge to prevent collection of water over the concrete flooring.

14 Claims, 2 Drawing Sheets

WATERPROOF DECKING METHOD AND APPARATUS

Matter enclosed in heavy brackets [ ] appears in the original patent but forms no part of this reissue specification; matter printed in italics indicates the additions made by reissue.

BACKGROUND OF THE INVENTION

The present invention relates to a waterproof deck and to a method of making a waterproof deck and especially to an apparatus and method which prevents the accumulation of water between a concrete floor and the waterproof membrane on the subfloor.

In the past, it has been common to make concrete decks for apartment buildings and the like in which the deck is placed between walls on three sides and open on the fourth side. Decks are typically made with joists mounted between the walls and a plywood subfloor attached to the joists. Typically, a waterproof membrane, such as building paper, coated felt roofing material, roofing asphalt or the like, is used to coat a subfloor and then a concrete flooring is poured on top of the waterproof coating to form the floor. A drip edge is commonly used along the open edge of the deck. The deck may have a slight slope so that rain or water falling onto the deck drains off the concrete and over the drip edge. Prior art decks of this type have tended to have the subflooring and joist rot out in a fairly short period of time as a result of the accumulation of moisture from the concrete below the concrete flooring. In a typical deck of this type, flashing has been placed around the deck along the walls adjacent the attached deck and a waterproof sheathing has been placed on the subfloor so that water accumulating from the concrete floor tends to accumulate under the concrete floor and tends to get through or around the waterproof sheathing placed on the subfloor. This happens because the sheathing is sometimes not fully watertight and at other times tends to get damaged, such as with minute holes that allow the seepage of water therethrough. The water that accumulates under the concrete floor has no where to run off and thereby tends to accumulate and build up until any leak or spacing around the flashing allows the seepage to make its way to the wooden subfloor and joists which then very quickly rot out and causes extensive damage.

For efficient water shedding at the deck and roof edges of a building, a metal drip edge is usually installed. These have various shapes and may be formed from 26 gauge galvanized steel. They extend back about three inches from the deck edge and are bent downward over the edge and may have an outwardly bend or lip at the edge of the metal to cause the water to drip free of the underlying deck or joist construction. It has also been common in the past to use T-bar edge materials extending over a roof edge especially in flat or built-up roofs where the metal portion of the T-bar extends over the roof sheathing and also has raised edges to act as a metal gravel stop for containing gravel covering the built-up roof. Built-up roofs commonly use sheathing paper or felt as well as corner flashing to protect the surfaces.

The present invention is directed towards a system for preventing the damage by the rotting of concete floor decks wooden components commonly used in multi-story buildings and the like and provide an apparatus and method for preventing accumulation of the water and moisture over and beneath the concrete surface.

Prior U.S. patents that have been found of interest to the present invention include the O'Riordain, U.S. Pat. No. 4,274,238, for a roof structure providing for efficient drainage of flat roofs and includes a drainage board above a water barrier layer and below a thermal insulation layer so that water falling on a flat roof passes through the protective layer of gravel through the abutting joints of a thermal insulation layer and through the drainage board and to conventional water gulleys and downpipes. In the VanWagoner, U.S. Pat. No. 4,719,713, a thermally efficient protected membrane roofing system is provided which also includes a drainage and insulation board and a vapor barrier. The seams between adjacent roofing panels is covered with a waterproof but vapor permeable tape and the panels are covered with a protective layer. The Paquette, U.S. Pat. No. 4,937,990, shows a ventilation system for roofs which makes the drying of roof insulation easier. The Paquette et al. U.S. Pat. No. 5,144,782, similarly has a double level drainage system for flat roofs so that water which may collect between the upper and lower membranes of flat, horizontal, or slightly sloped roofs upon perforation of the upper membrane. The insulated panels located between the two membranes are provided at both their upper and lower faces with a network of intersecting grooves and a lower drain is sealed to and opens through the lower membrane to drain any water that has seeped thereinto. The Carter, U.S. Pat. No. 3,434,260, has a series of separately formed gutters underlying the joints between adjacent tiles so that water penetrating the joints is drained by the underlying gutter to the next floor tile and onto the aligned next lower channel. The LaRoche et al., U.S. Pat. No. 4,663,894, is a flexible gutter attached beneath expansion joints for draining off water seeping between the expansion joints at the abutment of interconnecting concrete surfaces. The Riley et al., U.S. Pat. No. 4,658,554, is a protected membrane roof system for high traffic roof areas having a waterproof membrane attached to the roof deck and extruded panels of closed cell polystyrene foam mounted on top of the membrane to protect the membrane from thermal cycling, ultraviolet rays, and physical damage and is resistant to water. Concrete panels are laid directly on top of the polystyrene foam. In the Ager, U.S. Pat. No. 2,646,011, a roof gutter is provided for flat roofs which forms a trough section and spillway with specially formed sheet metal.

The present invention provides a simplified disposal of accumulated moisture through a concrete floor to prevent the accumulation of moisture between the floor and the waterproof membrane covering the subfloor so that the cost of building the decks does not increase substantially while preventing subfloors, joists, and the like from rotting out. The problem results because concrete does not provide a total barrier to the passage of moisture and water tends to accumulate beneath the concrete surface where the concrete surface is frequently covered with water. Generally, building codes require that concrete floors always have a moisture barrier placed over any wooden surfaces to which the concrete is to be placed upon. This, however, has not been effective in preventing the wood structure which supports a concrete deck from being damaged by the accumulation of moisture which finds its way through or around the waterproof membrane.

SUMMARY OF THE INVENTION

A method of making a waterproof deck includes the steps of applying a metal drip edge strip to one edge of a deck subfloor and then applying an elastomeric waterproofing material over the subfloor. A strip of T-bar material is selected and attached to the edge of a deck subfloor over some spacing strips of the elastomeric material with one portion of the T-bar strip extending over the drip edge and a second portion forming an upright raised edge and then pouring concrete over the elastomeric waterproofing material covering the subfloor to a level approximately to the top edge of the T-bar strip so that a concrete deck is provided with water runoff over a T-bar and water under the concrete floor drains over the drip edge under the T-bar. The selected T-bar has a second drip edge formed thereon and is spaced with additional elastomeric waterproofing material. A waterproof deck includes a deck subflooring supported on joists adjacent a building, a flashing adjacent a building, and a drip edge attached along the edge of a subflooring where the water runs off the deck. An elastomeric waterproofing material covers the subflooring and a strip of T-bar edging is attached along the edge of the subfloor and has a portion extending over the elastomeric waterproofing material and over the drip edge and another portion extending above the subfloor to form a raised edge therealong. Concrete covers the elastomeric waterproofing material and subfloor to the top edge of the T-bar raised edge so that water on the concrete flooring runs off the deck over the T-bar drip edge and drain from beneath the concrete floor over the drip edge to prevent collection of water over the concrete flooring.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
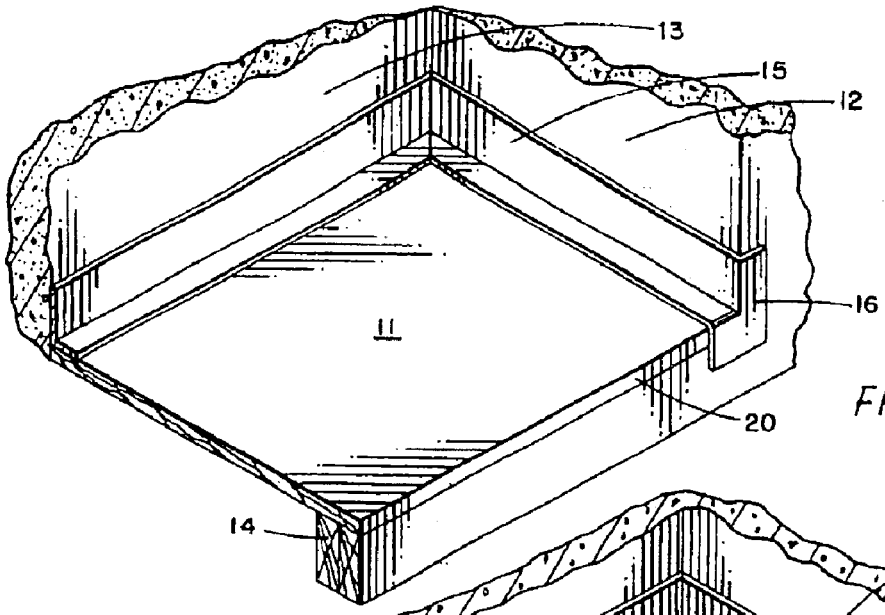
FIG. 1 is a partial perspective view of a deck under construction.
Figure 3:
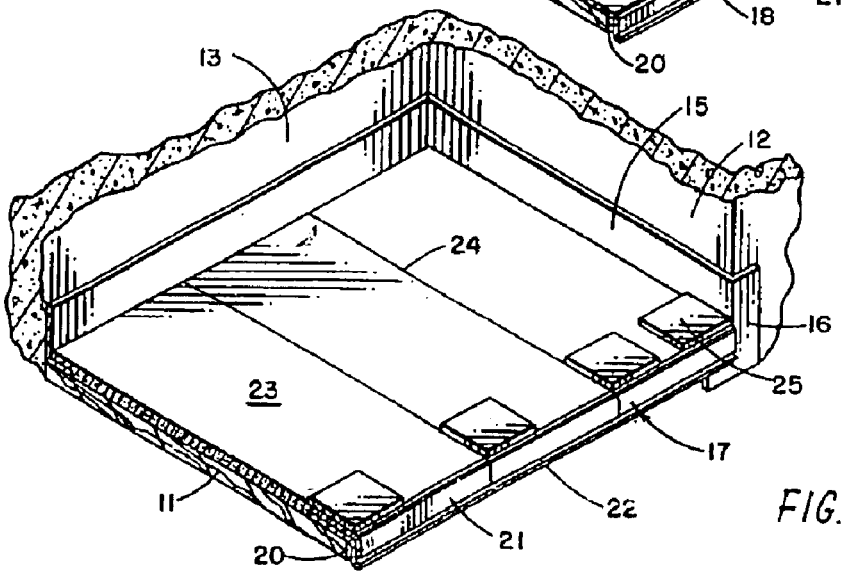
FIG. 3 is a partial perspective view of a partially finished deck having the elastomeric waterproofing membrane over the subfloor.
Figure 4:
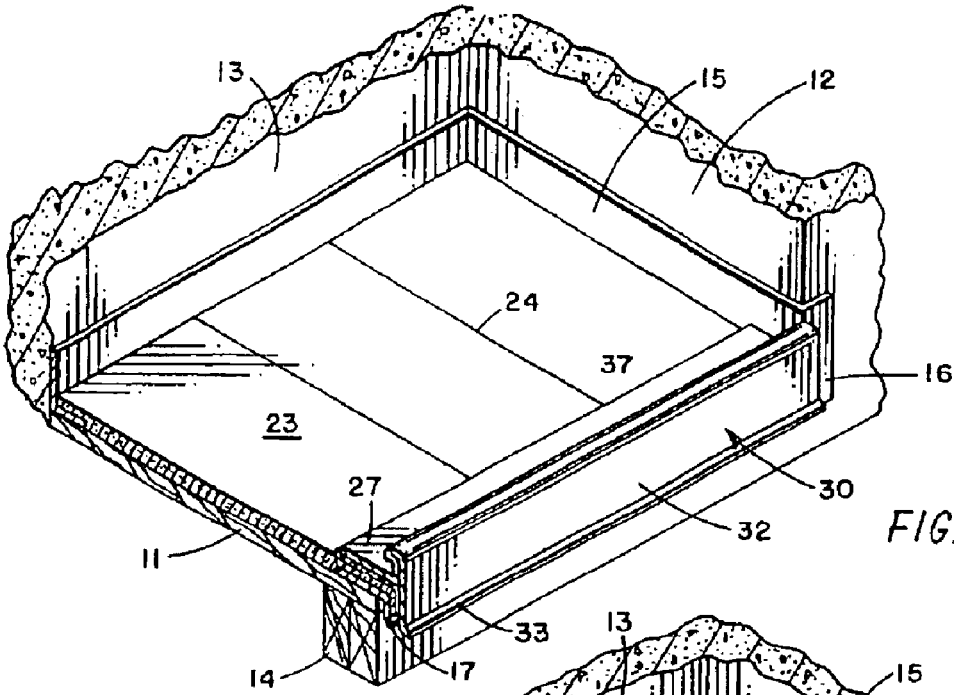
FIG. 4 is a partial perspective view of a partially fin deck having a T-bar strip added thereto.
Figure 5:
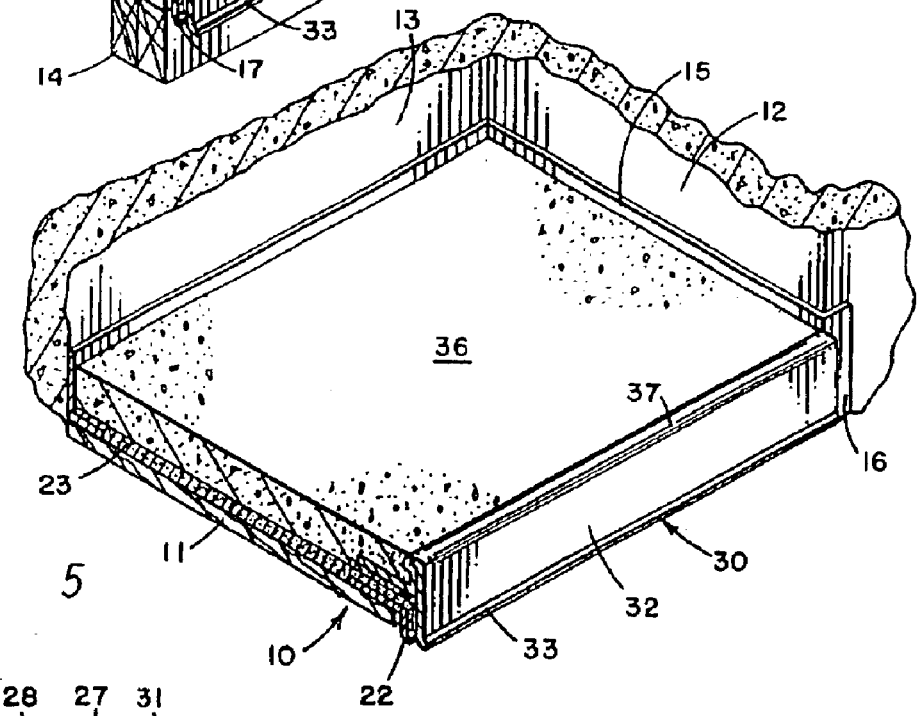
FIG. 5 is a partial perspective view of a concrete deck.

Referring to FIGS. 1–6 of the drawings, a portion of a concrete deck 10 in FIG. 5 is formed by first attaching a subfloor 11 in FIG. 1, which subfloor may be ¾ plywood or tongue and groove subfloor. The subfloor 11 is mounted to adjacent concrete or wood sidewalls 12 and rear walls 13. The deck has an open front. A pair of 2×10 wooden joists 14 are shown supporting the front edge of the subflooring but other joists could also be incorporated into the deck. The subflooring 11 has metal flashing 15 attached at the corners over the edge of the subflooring and along the walls 12 and 13 and has outside corner flashing 16 applied to the wall corner. In the case of a post support, the flashing 15 and 16 is wrapped around the post.

Figure 2:
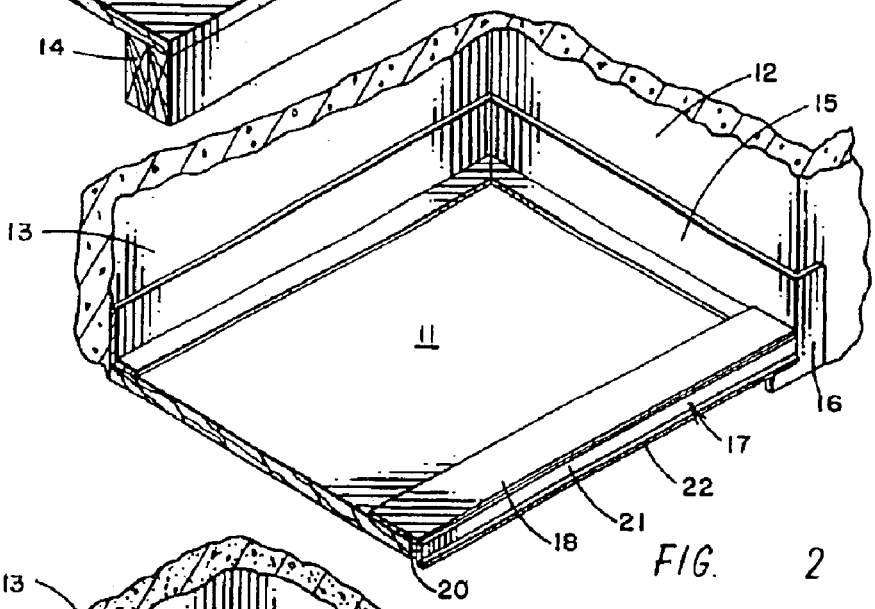
FIG. 2 is a partial perspective view of a deck under construction with metal drip installed.

In FIG. 2, a drip edge 17 has been attached along the front edge 20 of the subfloor 11 which edge is the open side of the deck and adjacent the front supporting joint 14. The drip edge 17 has a metal portion 18 extending a short distance over the subflooring 11 along the subflooring edge 20 and then a vertically extending portion 21 extending in front of the subflooring 11 with an angled lip 22 to form the edge of the drip edge for draining water therefrom. A waterproof membrane which may be an elastomeric waterproof material 23, such as BITUTHENE by W. R. Grace Co., which is a rubberized asphalt with four mils of high density polyethylene, and provides a flexible waterproof material which is self-sealing at the edges 24. However, other waterproofing elastomers can also be utilized without departing from the spirit and scope of the invention.

Figure 6:
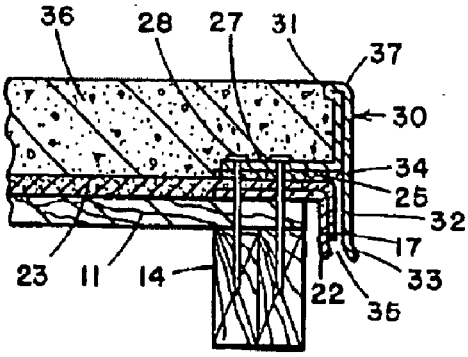
FIG. 6 is a sectional view of a finished deck section.

The deck under construction in FIG. 3 has a plurality of spacers 25, such as 4×4 inch spacers of the elastomer material 23 placed along the front edge 20 of the subflooring 11. As seen in FIG. 4, a measured strip of metal T-bar material has the one leg 27 placed on top of the spacers 25 and on top of the elastomeric material 23 over the front edge thereof and directly over the drip edge 17. The drip edge 17 can be anchored to the subfloor and to the joist with nails or other fasteners as desired and the T-bar stud is similarly anchored with nails 28 or the like through the drip edge 17, top portion 18 and through the T-bar strip portion 27, as shown in FIG. 6. The T-bar strip has a raised edge 30 having a reinforcing lip 31 along the top thereof and also has a downwardly extending portion 32 having an angled lip 33 thereon which acts as a drip edge. The elastomer 23 has also been extended and turned down over the drip edge to form a front edge 34.

The T-bar strip is attached in FIG. 4 along the front edge 20 of the subfloor such that a parallel space 35 is formed between the T-bar strip and the drip edge 17 so that the lip 22 of the drip edge 17 and the lip 33 of the T-bar strip 30 are spaced from each other. This allows moisture to drip off without running down the sides of the wall of a building or the front edge of the deck.

Once the deck has been completed, as shown in FIG. 4, the concrete floor 36 is then poured to the approximate top edge 37 of the raised edge 37 and within the confines of the flashing 15 along the sides and over the waterproof barrier of elastomer material 23 covering the subfloor 11 (FIG. 5). Water from rain covers the top of the concrete deck and drains off the front open end of the slightly angled deck and drains over the T-bar strip 30 and off the lip 33. However, since the concrete is not a complete barrier to the passage of moisture, it tends to accumulate under the concrete. The water accumulates on the waterproof elastomer barrier 23 which is also angled with the deck and the water flows along the elastomer material until it passes under the T-bar anchoring portion 27, past the spacers 25 and over the drip edge 17, and off the drip edge lip 22 to be separately drained and thereby prevent accumulation on the surface of the elastomer coating 23. The subflooring 11 and the joist 14 are protected from moisture seepage through water getting around the flashing 15 from above and through the concrete and seepage through pinholes or other areas of the membrane to cause the joist and subfloor to rot.

It should be clear at this time that both a concrete deck and a method of making a concrete deck have been provided. However, it should be clear that the present invention is not intended to be limited to the forms shown which are to be considered illustrative rather than restrictive.

I claim:

1. A waterproof deck comprising:

a deck subfloor supported on joists adjacent a building;

a drip edge *having an inverted, generally L-shaped cross-section with a first portion* attached along [the] *an upper surface of an* edge of said deck subfloor *and a second portion depending from said first portion and overlaying an end of said deck subfloor* whereby water [runs off of the deck] *is adapted to run over the drip edge and off the deck*;

an elastomeric waterproofing material covering said subfloor *and overlaying said first portion of said drip edge*

*and extending downward onto said second portion of said drip edge*;

a strip of T-bar edging attached along the edge of said subfloor and having one portion extending over said elastomeric waterproofing material and over said drip edge and another portion extending above said subfloor to form a raised edge therealong; [and]

a concrete floor covering said elastomeric waterproofing material and subfloor to a level approximately along the top edge of said T-bar raised edge, whereby water drains off said concrete floor over said T-bar edging and drains from beneath said concrete floor over said drip edge to prevent collection of water below said concrete floor*; and*

*a plurality of spacers positioned between said T-bar edging portion and said elastomeric material to thereby form a space under said T-bar edging whereby water accumulated under the concrete floor is adapted to run over the elastomeric material and the drip edge.*

[2. A waterproof deck in accordance with claim 1 in which a plurality of spacers are positioned under said T-bar edging portion extending over said elastomeric material and drip edge to thereby form a space under said T-bar edging.]

3. A waterproof deck in accordance with claim [2] *1* including flashing covering the corners between a building and said subfloor.

4. A waterproof deck in accordance with claim 3 in which said T-bar edging has a drip edge lip therealong spaced from and parallel to said drip edge.

5. A method of making a waterproof deck comprising the steps of:

attaching a deck subfloor to *a* building;

attaching *a first portion of* a metal drip edge [to] *along an upper surface of* one edge of said deck subfloor *whereby a second portion of said drip edge extends downward over an end of said deck subfloor*;

applying an elastomeric waterproofing material over said subfloor;

selecting a T-bar strip of material;

attaching said T-bar strip of material to the edge of said deck subfloor with one portion extending over said drip edge and a second portion forming a raised edge; [and]

*placing a plurality of spacers between said T-bar strip and said elastomer material to create a drainage space whereby water accumulation below said concrete floor is minimized; and* pouring concrete over said elastomer waterproofing material covered subfloor to a level approximately with the top edge of said attached T-bar strip raised edge, whereby a deck is provided with a water runoff over a T-bar strip and a water runoff under said concrete floor and over said drip edge beneath said T-bar strip.

[6. A method of making a waterproof deck in accordance with claim 5 including the step of placing a plurality of spacers between said T-bar strip and said elastomer covered subfloor to thereby allow drainage from said subfloor below said concrete floor below said attached T-bar strip.]

7. A method of making a waterproof deck in accordance with claim [6] *5* including the step of cutting said selected T-bar strip to a predetermined length.

8. A method of making a waterproof deck in accordance with claim 7 including the step of applying corner flashing between said deck subfloor and an adjacent building.

9. A method of making a waterproof deck in accordance with claim 8 including the step of attaching a subfloor to building joists.

10. A method of making a waterproof deck in accordance with claim 9 including the step of selecting said T-bar strip having a drip edge formed thereon.

11. A method of making a waterproof deck in accordance with claim 10 in which the step of attaching said T-bar strip to the edge of said deck subfloor includes nailing said T-bar strip and said metal drip edge to said deck subfloor.

12. A method of making a waterproof deck in accordance with claim 10 in which the step of attaching a metal drip edge includes nailing said drip edge to said deck subfloor.

*13. The waterproof deck of claim 1, wherein said plurality of spacers comprises a separate piece of material positioned between said T-bar edging portion and said elastomeric material.*

*14. The waterproof deck of claim 13, wherein said plurality of spacers comprises 4 inch by 4 inch spacers of elastomer material.*

*15. The method of claim 5 wherein said plurality of spacers comprises a separate piece of material positioned between said T-bar edging portion and said elastomeric material.*

*16. The method of claim 15, wherein said plurality of spacers comprises 4 inch by 4 inch spacers of elastomer material.*

* * * * *